United States Patent [19]
Kupperman et al.

[11] Patent Number: 5,349,568
[45] Date of Patent: Sep. 20, 1994

[54] LEAK LOCATING MICROPHONE, METHOD AND SYSTEM FOR LOCATING FLUID LEAKS IN PIPES

[75] Inventors: David S. Kupperman, Oak Park; Lev Spevak, Highland Park, both of Ill.

[73] Assignee: The University of Chicago, Chicago, Ill.

[21] Appl. No.: 127,742

[22] Filed: Sep. 27, 1993

[51] Int. Cl.$^5$ .......................... G01S 3/80; G01M 3/00
[52] U.S. Cl. .................. 367/125; 73/40.5 A; 367/167; 367/172
[58] Field of Search ............... 367/125, 167, 172, 163, 367/174, 159, 188, 155, 180; 73/40.5 A, 592

[56] References Cited
U.S. PATENT DOCUMENTS

| | | | |
|---|---|---|---|
| 4,289,019 | 9/1981 | Claytor | 73/40.5 A |
| 4,435,974 | 3/1984 | Fuchs et al. | 73/40.5 A |
| 5,205,173 | 4/1993 | Allen | 73/592 |

*Primary Examiner*—Daniel T. Pihulic
*Attorney, Agent, or Firm*—Mason, Kolehmainen, Rathburn & Wyss

[57] ABSTRACT

A leak detecting microphone inserted directly into fluid within a pipe includes a housing having a first end being inserted within the pipe and a second opposed end extending outside the pipe. A diaphragm is mounted within the first housing end and an acoustic transducer is coupled to the diaphragm for converting acoustical signals to electrical signals. A plurality of apertures are provided in the housing first end, the apertures located both above and below the diaphragm, whereby to equalize fluid pressure on either side of the diaphragm. A leak locating system and method are provided for locating fluid leaks within a pipe. A first microphone is installed within fluid in the pipe at a first selected location and sound is detected at the first location. A second microphone is installed within fluid in the pipe at a second selected location and sound is detected at the second location. A cross-correlation is identified between the detected sound at the first and second locations for identifying a leak location.

8 Claims, 2 Drawing Sheets

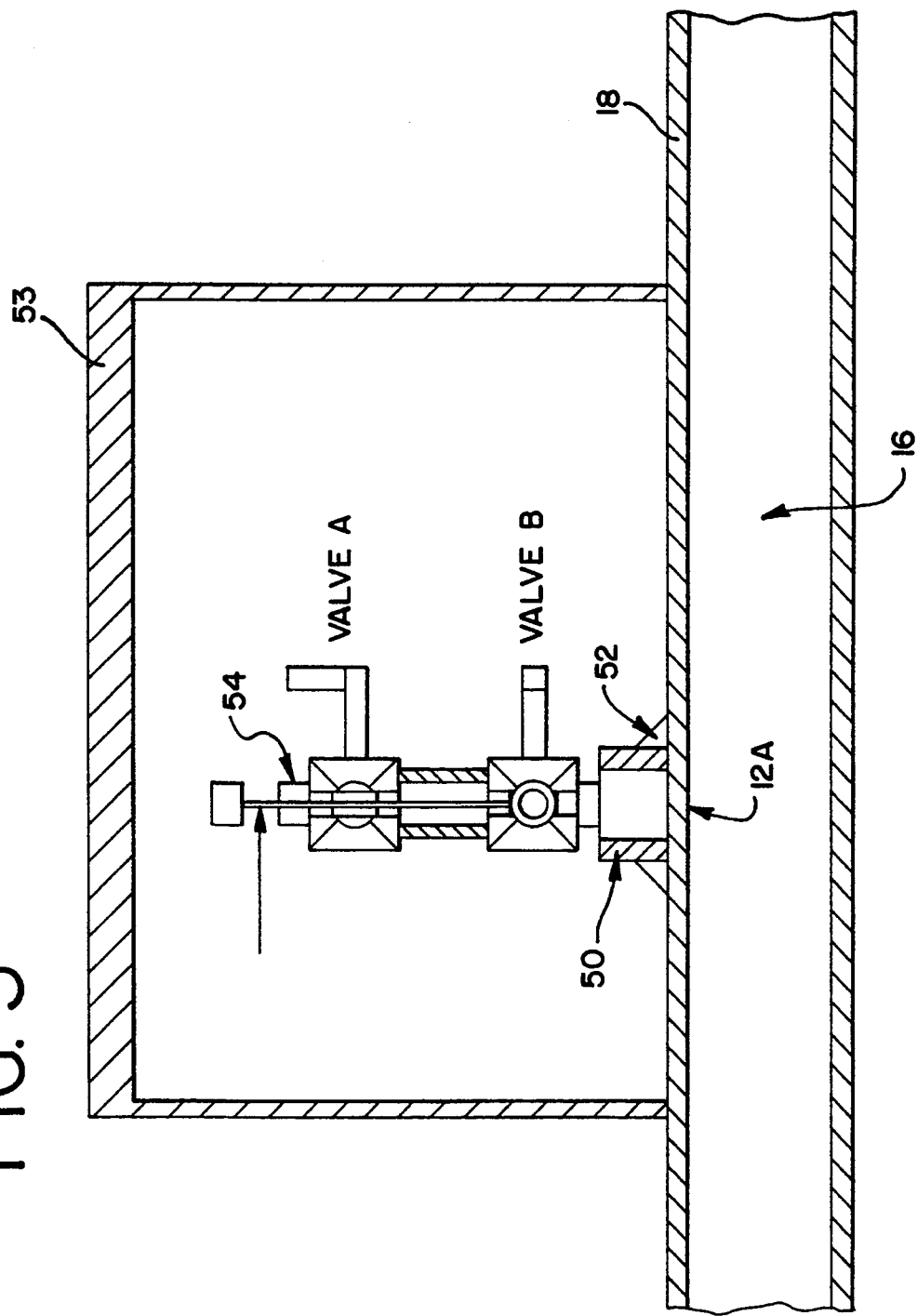

LEAK LOCATING MICROPHONE, METHOD AND SYSTEM FOR LOCATING FLUID LEAKS IN PIPES

CONTRACTUAL ORIGIN OF THE INVENTION

The United States Government has rights in this invention pursuant to Contract No. W-31-109-ENG-38 between the United States Government and Argonne National Laboratory.

BACKGROUND OF THE INVENTION

1. Field of the Invention

The invention relates to a method and system for detecting fluid leaks in pipes and a leak detecting microphone operating directly within a gas or other fluid at high temperature and high pressure for generating a signal used to locate a fluid leak.

2. Background of the Invention

Detection and location of leaks in gas, steam and other fluid-carrying lines is of significant importance to utility and other industrial organizations. In some instances, microphone systems have been used.

For example, U.S. Pat. No. 4,289,019 discloses a method and apparatus for passive detection of a leak in a buried pipe containing fluid under pressure. Noise produced by the leak is detected by a plurality of acoustic detectors that are placed in contact with the outside wall of the pipe and the detected signals are correlated to locate the leak.

However, it is understood that the sensing elements for the microphones have been mounted and operate external to the fluid. One disadvantage of the known arrangements is poor sensitivity so that only substantial breaks in pipes can be reliably detected. Also background noise and structural noise vibration can result in erroneous leak detections.

It is an object of the present invention to provide an improved method and system for locating a fluid leak.

It is an object of the present invention to provide an improved method and system using at least two microphones disposed into a fluid within the pipe for locating a fluid leak.

It is an object of the present invention to provide an improved method and system using at least two microphones disposed into a fluid within the pipe for locating a fluid leak to provide improved sensitivity and reliable operation.

It is an object of the present invention to provide a microphone capable of being inserted into a pipe directly in contact with a fluid.

It is an object of the present invention to provide a microphone capable of being inserted into a pipe directly in contact with a fluid having a high temperature, such as 350° F. and at high pressures, such as 180 psi.

It is an object of the present invention to provide an improved method and system for locating a fluid leak overcoming some of the disadvantages of known arrangements for locating a leak.

SUMMARY OF THE INVENTION

In brief, these and other objects and advantages of the invention are provided by a leak detecting microphone inserted directly into fluid within a pipe and a leak locating method and system. The microphone includes a housing having a first end being inserted within the pipe and a second opposed end extending outside the pipe. A diaphragm is mounted within the first housing end and an acoustic transducer is coupled to the diaphragm for converting acoustical signals to electrical signals. A plurality of apertures are provided in the housing first end, the apertures located both above and below the diaphragm, whereby to equalize fluid pressure on either side of the diaphragm.

A leak locating system and method are provided for locating fluid leaks within a pipe. A first microphone is installed within fluid in the pipe at a first selected location and sound is detected at the first location. A second microphone is installed within fluid in the pipe at a second selected location and sound is detected at the second location. A cross-correlation is identified between the detected sound at the first and second locations for identifying a leak location.

BRIEF DESCRIPTION OF THE DRAWINGS

The present invention together with the above and other objects and advantages may best be understood from the following detailed description of the embodiment of the invention illustrated in the drawings, wherein:

FIG. 3 is a schematic representation of apparatus for inserting the microphone into a fluid filled pipe in the leak detection system of FIG. 1.

DETAILED DESCRIPTION OF THE PREFERRED EMBODIMENT

Figure 2:
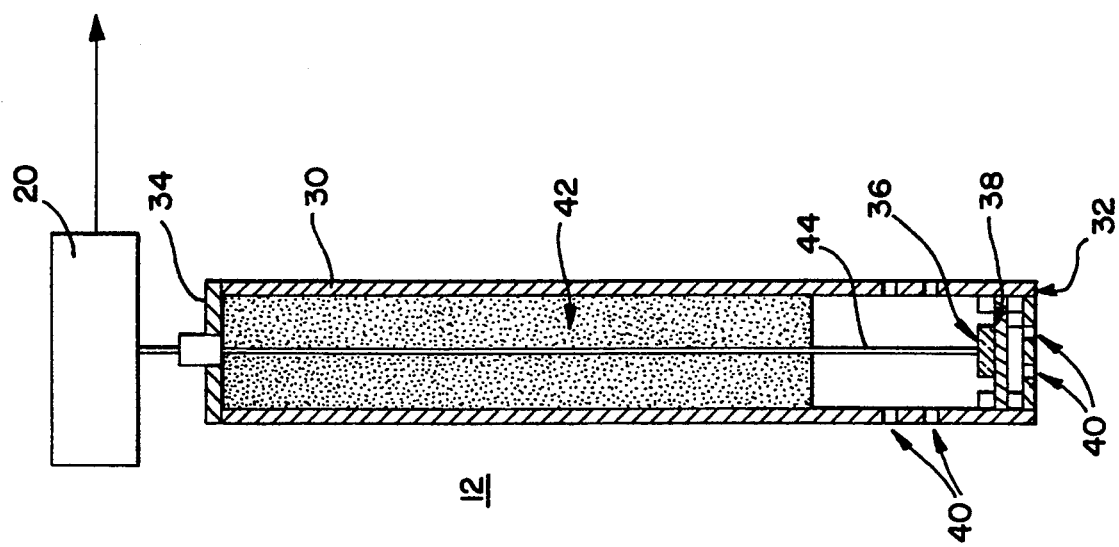
FIG. 2 is a schematic representation of a microphone of the leak detection system of FIG. 1.
Figure 1:
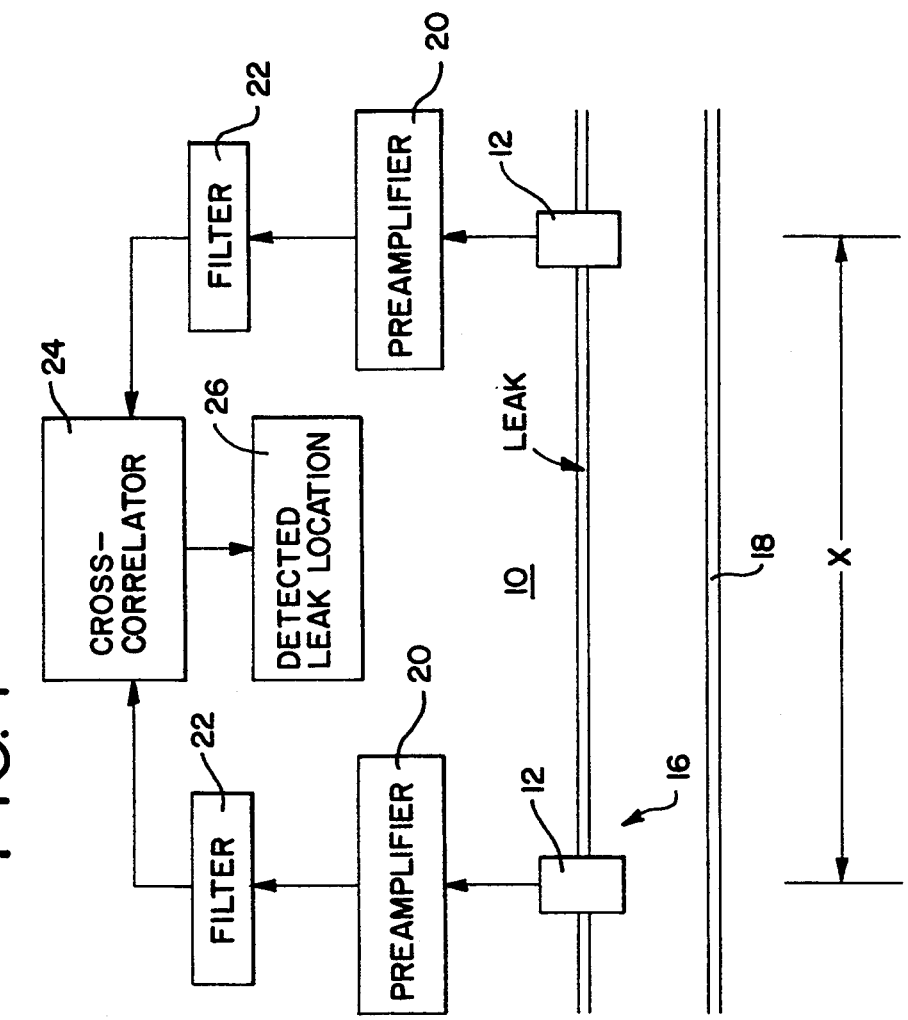
FIG. 1 is a schematic block diagram representation of a leak detection system of the invention.

In accordance with the present invention, a leak detection system 10 includes two or more microphones 12 mounted to extend directly into the gas or other fluid 16 carried within a pipe 18 or other similar fluid-carrying vessel. Each of the microphones 12 detect sound waves or noise within the fluid 16 generated by leaks in the pipe 18. An acoustical signal generated by each microphone 12 is amplified by a preamplifier 20. The amplified signal output of the preamplifier 20 is applied to and filtered by a filter 22. The amplified and filtered acoustical signals from the filters 22 are applied to a cross-correlator 24. Knowledge of the distance between the two microphones 12 indicated by an arrow labelled X and of the velocity of the propagation of the sound waves detected by the microphones 12 enables the cross-correlator 24 to identify a detected leak location as indicated at a block 26.

Microphone 12 allows fluid leaks to be detected and located by analyzing the acoustic signal sensed by two microphones 12. Microphones 12 can be separated by several thousand feet.

U.S. Pat. No. 4,289,019 discloses acoustical signal processing circuitry that advantageously can be used for the filters 22 and cross-correlator 24. The disclosure of U.S. Pat. No. 4,289,019 is incorporated herein by reference.

Referring to FIG. 2, there is shown a schematic representation of the microphone 12 of the leak detection system 10. Microphone 12 includes a housing 30 having a first end 32 inserted within the pipe 18 and a second opposed end 34. Microphone 12 employs a piezoelectric transducer (PZT), leadmetanioate or other piezoelectric material crystal 36 attached to a stainless steel diaphragm 38 for converting acoustical signals into electrical signals. The diaphragm 38 and crystal 36 are directly exposed to the fluid 16. Frequency response of the microphone 12 is critical to the operation of system 10. Frequency response is set at a selected frequency, for example, such as approximately 5 kHz or in a predefined range of 3–8 kHz to help eliminate spurious background noise but low enough to allow propagation of acoustic leak signals over great distances in a pipe. The ratio of the crystal diameter to diaphragm diameter, and diaphragm thickness is optimized through conventional theoretical considerations.

Various commercially available crystals can be used for crystal 36 such as sold by Crystal Technology Inc. of Mountain View, Calif. or by Solvay Technologies, Inc. of New York, N.Y. Diaphragm 38 is made of a corrosion resistant material having sufficient strength to tolerate differential pressure and flexibility to transmit acoustical signals to the crystal 36. A relatively thin stainless steel member, for example, such as 5 mils thick, advantageously is used for diaphragm 38.

A plurality of holes 40 are provided in the cylindrical housing 30 above and below the crystal 36 and diaphragm 38 to provide for equalization of pressure. Holes 40 keep the fluid pressure on either side of the diaphragm 38 equalized when the microphone 12 is inserted into the fluid 16, thus preventing its failure while still allowing it to resonate. An epoxy or cement filler 42 surrounds a conductor 44 coupling the electrical signal from crystal 36 to the preamplifier 20 and seals the microphone 12.

By using a pair of these microphones 12 and cross correlation analysis of the amplified and filtered signals from a small leak, a leak which was between the sensors, could be located to within less than a foot. Signals from steam leaks could be detected by these microphones 12 at temperatures up to 350° F.

A feature of the invention is that microphone 12 is designed to be used with a hot-tap so that the microphone can be inserted into a pipe without turning off the gas or steam. The microphone 12 is small enough to be inserted through a hot-tap arrangement illustrated and described with reference to FIG. 3 into the pipe 18. The microphone 12 has a predetermined size, for example, such as a 9/16 inch diameter or 1.4 cm, to be inserted through a valve opening into the fluid without turning off the gas or steam.

Microphone 12 isolates the background and structural noise vibrations while still maintaining good sensitivity. Microphone 12 can be operated at temperatures to 350° F. and pressures to 180 psi.

Microphone 12 of the leak-detecting system 10 operates at a frequency of about 5 kHz. Operational tests of the leak detection system 10 with a pair of microphones 12 using cross correlation analysis, have resulted in the location of a leak to within less than a foot.

FIG. 3 illustrates apparatus for installing the microphones 12 into the pipe 18. First a standoff 50 is welded to the pipe 18, indicated by weld 52. A pair of small valves labelled Valve A and Valve B and a protective shield 53 are attached to the standoff 50. Initially Valve A and Valve B are closed, then Valve A is opened and a drill (not shown) is inserted and the drill is sealed at a packing 54. Then valve B is opened and an opening at 12A for receiving the microphone 12 is drilled in the pipe 18. Next the drill is raised beyond Valve B and Valve B is closed. Then the drill is removed and Valve A is closed. To insert the microphone 12 into the pipe 18, Valve A is opened and the microphone housing 30 is inserted and sealed at the packing 54. Then Valve B is opened and the microphone is pushed into the pipe 18.

While the invention has been described with reference to details of the illustrated embodiment, these details are not intended to limit the scope of the invention as defined in the appended claims.

What is claimed and desired to be secured by Letters Patent of the United States is:

1. A leak detecting microphone for insertion directly into fluid within a pipe comprising:
    a housing having a first end being inserted within the pipe and a second opposed end extending outside the pipe;
    a diaphragm mounted within said first housing end;
    an acoustic transducer coupled to said diaphragm for converting acoustical signals to electrical signals; and
    a plurality of apertures provided in said housing first end, said apertures located both above and below said diaphragm, whereby to equalize fluid pressure on either side of the diaphragm.

2. A leak detecting microphone as recited in claim 1 wherein said housing is a generally cylindrical member formed of corrosion resistant material.

3. A leak detecting microphone as recited in claim 1 wherein said diaphragm is a member formed of corrosion resistant material.

4. A leak detecting microphone as recited in claim 1 wherein said diaphragm is formed of stainless steel.

5. A leak detecting microphone as recited in claim 1 wherein said acoustic transducer is a piezoelectric crystal.

6. A leak detecting microphone as recited in claim 1 wherein said acoustic transducer is a leadmetanioate crystal.

7. A leak detecting microphone as recited in claim 1 wherein said acoustic transducer is a piezoelectric transducer.

8. A leak locating system for locating fluid leaks within a pipe comprising:
    first microphone means disposed within the pipe for detecting sound at a first selected location;
    second microphone means disposed within the pipe for detecting a sound at a second selected location;
    cross-correlator means responsive to said first microphone means and said second microphone means for identifying a leak location; and
    wherein each of said first microphone means and said second microphone means include;
    a housing having a first end being inserted within the pipe and a second opposed end extending outside the pipe;
    a diaphragm mounted within said first housing end;
    an acoustic transducer coupled to said diaphragm for converting acoustical signals to electrical signals; and
    a plurality of apertures provides in said housing first end, said apertures located both above and below said diaphragm, whereby to equalize fluid pressure on either side of the diaphragm.

* * * * *